(12) United States Patent
Cao et al.

(10) Patent No.: US 11,394,328 B2
(45) Date of Patent: Jul. 19, 2022

(54) CONTROL METHOD OF BRUSHLESS DC MOTOR SYSTEM BASED ON HYBRID ENERGY STORAGE UNIT

(71) Applicant: ZHEJIANG UNIVERSITY, Zhejiang (CN)

(72) Inventors: Yanfei Cao, Zhejiang (CN); Haitian Lu, Zhejiang (CN); Peng Song, Zhejiang (CN); Xinmin Li, Zhejiang (CN); Tingna Shi, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 0 days.

(21) Appl. No.: 17/270,040

(22) PCT Filed: Feb. 24, 2020

(86) PCT No.: PCT/CN2020/076338
§ 371 (c)(1),
(2) Date: Feb. 22, 2021

(87) PCT Pub. No.: WO2021/068446
PCT Pub. Date: Apr. 15, 2021

(65) Prior Publication Data
US 2022/0131489 A1  Apr. 28, 2022

(30) Foreign Application Priority Data
Oct. 8, 2019 (CN) .......................... 201910950685.9

(51) Int. Cl.
*H02P 21/36* (2016.01)
*H02P 9/30* (2006.01)
(Continued)

(52) U.S. Cl.
CPC ............ *H02P 21/36* (2016.02); *H02J 7/1423* (2013.01); *H02J 7/24* (2013.01); *H02P 6/10* (2013.01);
(Continued)

(58) Field of Classification Search
CPC .... H02P 21/36; H02P 6/10; H02P 7/28; H02P 9/302; H02J 7/1423; H02J 7/24; H02J 2207/50
See application file for complete search history.

(56) References Cited

U.S. PATENT DOCUMENTS 9,809,119 B2 * 11/2017 She .................... B60L 50/51

FOREIGN PATENT DOCUMENTS

CN 209120094 U * 7/2019

OTHER PUBLICATIONS

Y. Dasari, D. Ronanki and S. S. Williamson, "Novel Bank Switching of Supercapacitors with Enhanced Energy Utilization for Electric Vehicular Applications," 2020 IEEE Transportation Electrification Conference & Expo (ITEC), 2020, pp. 484-488, (Year: 2020).*

* cited by examiner

*Primary Examiner* — Said Bouziane

(57) ABSTRACT

A brushless DC motor system control method provided is based on a hybrid energy storage unit. The HESU topology is designed, and the output of the designed HESU is connected to the input of three-phase inverter, and the output of three-phase inverter is connected with the three-phase windings of the BLDCM. In braking operation, two kinds of braking vectors are constructed according to the HESU and three-phase inverter. Moreover, through the combined action of the two vectors, the braking torque control is achieved and meanwhile the braking energy is fed back to the supercapacitor. In electric operation, four kinds of electric (Continued)

vectors are constructed according to the HESU and three-phase inverter. Moreover, the power sharing control between battery and supercapacitor is realized by different vectors action during motor acceleration mode, and the torque ripple in commutation period is suppressed by different vectors action during motor constant speed mode.

6 Claims, 8 Drawing Sheets

(51) Int. Cl.
     *H02J 7/14*          (2006.01)
     *H02P 6/10*          (2006.01)
     *H02P 7/28*          (2016.01)
     *H02J 7/24*          (2006.01)

(52) U.S. Cl.
     CPC ............... *H02P 7/28* (2013.01); *H02P 9/302* (2013.01); *H02J 2207/20* (2020.01); *H02J 2207/50* (2020.01)

CONTROL METHOD OF BRUSHLESS DC MOTOR SYSTEM BASED ON HYBRID ENERGY STORAGE UNIT

BACKGROUND OF THE PRESENT INVENTION

Field of Invention

The present invention relates to a brushless DC motor (BLDCM) system control method, in particular to a BLDCM system control method based on hybrid energy storage unit (HESU).

Description of Related Arts

BLDCM is widely used in electric vehicle, industrial control and aerospace due to its high power density and simple structure. In many applications, the battery with high energy density is often used as main power supply, but there are some shortcomings of battery, such as limited power density and charge-discharge cycles and so on. For example, in the application of electric vehicles, the acceleration and braking process of motor will make the battery suffer from high-rate charging and discharging, which could make adverse influence on the battery life.

In recent years, scholars at home and abroad have proposed the application of supercapacitor/battery HESU. Compared with the battery, the supercapacitor has higher power density and longer life-cycle. Moreover, the application of HESU has the following advantages: first, in the braking process, the motor can convert mechanical energy into electrical energy and it can be recovered by the supercapacitor, which improves the energy utilization and avoids the adverse impact of frequent charging on battery life; second, in the acceleration process and other occasions where the motor needs to output high power, the supercapacitor can assist the battery to supply power for the motor, which can effectively alleviate the problem of battery life shortening caused by excessive output power.

E. Chemali and M. Peindl introduced the development status of supercapacitors and batteries, and explained the common HESU structure (IEEE Journal of Emerging and Selected Topics in Power Electron., vol. 4, no. 3, pp. 1117-1134, September 2016). The passive structure directly connects the supercapacitor and the battery in parallel, and it is a simple and reliable structure relatively. The power sharing between the supercapacitor and battery is determined by their internal resistance. However, due to the clamping effect of the battery voltage, the operating voltage range of the supercapacitor is limited. In order to improve the voltage utilization of the supercapacitor, an effective method is to connect the supercapacitor to the load through a bi-directional DC-DC converter, and connect the battery to the load directly to form a semi-active HESU. In addition, some scholars proposed an active structure which connects the battery and the supercapacitor to the load by two DC-DC converters, respectively. The HESU with DC-DC converter can effectively improve the voltage utilization range of supercapacitor. Since these HESUs needs additional inductors to achieve peak power transmission, the volume of the system needs to be weighed in the circuit design.

In the drive system with BLDCM as the core power component, the torque performance of the motor is the key index to evaluate the performance of the drive system, so it is of great significance to consider the torque performance of the motor while designing the HESU. At present, some scholars have carried out relevant research (IEEE Trans. Veh. Technol., Vol. 66, No. 5, pp. 3724-3738, may 2017; IEEE Trans. Veh. Technol., Vol. 60, No. 1, pp. 89-97, January 2011). However, there are few methods to consider the commutation torque ripple suppression of BLDCM while designing HESU. The commutation torque ripple of BLDCM in the operation process will produce large noise and vibration, and reduce the stability of motor operation.

SUMMARY OF THE PRESENT INVENTION

The present invention aims to overcome the above shortcomings of the prior art, designs a simple supercapacitor/battery HESU, and proposes a BLDCM operation control strategy based on the HESU, so that BLDCM can obtain good control performance under the braking deceleration, acceleration and constant speed operation modes.

In order to achieve the above purpose, as shown in FIG. 1, the present invention adopts the following technical scheme.

1) As shown in FIG. 1, the system includes an HESU, an inverter and a BLDCM. The HESU is designed with a battery, an electrolytic capacitor C, a bidirectional power switch, a first power MOSFET, a second power MOSFET and a supercapacitor SC. After the first power MOSFET and the second power MOSFET are connected in series, they are connected in parallel with the electrolytic capacitor C to both terminals of the battery. A drain of the first power MOSFET is connected to a positive pole of the battery, and a source of the second power MOSFET is connected to a negative pole of the battery. After the bidirectional power switch and supercapacitor SC are connected in series, they are connected in parallel to both terminals of the first power MOSFET, and a source of the first power MOSFET is connected to a negative pole of the supercapacitor. A lead between the second power MOSFET and the negative pole of the battery is taken as a negative terminal of an output of the HESU, and a lead between the bidirectional power switch and a positive pole of the supercapacitor SC is taken as a positive terminal of the output of the HESU. A negative terminal of the output of the HESU and a positive terminal of the output of the HESU constitutes two terminals of the output of the HESU. The output terminals of the HESU are connected to input terminals of a three-phase inverter, and output terminals of the three-phase inverter are connected with three-phase windings of the BLDCM.

In the specific implementation, the battery and the electrolytic capacitor are connected in parallel, and the positive pole of the battery is connected with the drain of the first power MOSFET, the negative pole of the battery is connected with the source of the second power MOSFET. The source of the first power MOSFET and the drain of the second power MOSFET are connected to the negative pole of the supercapacitor. Moreover, one terminal of the bidirectional power switch is connected with the positive pole of the battery, and the other terminal of the bidirectional power switch is connected with the positive pole of the supercapacitor. The positive terminal of the output of the HESU is connected to the positive terminal of a DC bus of the three-phase inverter, and the negative terminal of the output of the HESU is connected to the negative terminal of the DC bus of the three-phase inverter.

The described bidirectional power switch is composed of two MOSFETs in reverse series connection.

The described three-phase inverter comprises three parallel MOSFET groups, each MOSFET group is composed of two series-connection MOSFETs in the same direction, and the lead between the two MOSFETs of each group is connected to a phase winding of the BLDCM. The first MOSFET group is composed of the series connection of $S_{aH}$ and $S_{aL}$, in the same direction. The second MOSFET group is composed of the series connection of $S_{bH}$ and $S_{bL}$ in the same direction. The third MOSFET group is composed of the series connection of $S_{cH}$ and $S_{cL}$ in the same direction.

2) When the motor is in braking operation, according to an effect of a switching state of the power MOSFETs in the HESU and the three-phase inverter on an input line voltage of the BLDCM, two kinds of braking vectors are constructed. Through a combined action of the two braking vectors, braking torque control is realized and braking energy is fed back to the supercapacitor SC at the same time.

3) When the motor is in electric operation, according to the effect of the switching state of the power MOSFETs in the HESU and three-phase inverter on the input line voltage of the BLDCM, four kinds of electric vectors are constructed;

when the motor is in electric acceleration operation, power sharing control between the battery and the supercapacitor is realized through a combined action of different electric vectors;

when the motor is in electric constant speed operation, a torque ripple in commutation period is suppressed by the combined action of different electric vectors.

The step 2) is specifically as follows:

2.1) Two kinds of vectors constructed:

when the bi-directional power switch in the HESU is turned on, the power MOSFET of a lower bridge arm on a positive conduction phase of the BLDCM and the power MOSFET of an upper bridge arm on a negative conduction phase of the BLDCM in the three-phase inverter are turned on, and the rest of the power devices in the HESU and the three-phase inverter are turned off, a voltage vector formed is called as a first braking vector $V_{z,b1}$;

when the BLDCM is driven by square wave current with two phase conduction pattern, the energized windings whose conduction current is in phase with the positive back EMF is defined as the positive conduction phase, and the energized windings whose conduction current phase is opposite to the positive back EMF is defined as the negative conduction phase. The upper bridge arm power MOSFET is a power MOSFET connected to the output positive terminal of the HESU, and the lower bridge arm power MOSFET is a power MOSFET connected to the output negative terminal of the HESU;

when the second power MOSFET in the HESU is turned on, and the other power devices in the HESU and the three-phase inverter are turned off, the voltage vector formed is called as the second braking vector $V_{z,c0}$.

2.2) The combined action of the two vectors satisfies the following relationship $$d_{z,b1}u_b+(d_{z,b1}-1)u_{sc}=2R_sI-2E$$

where $d_{z,b1}$ is duty cycle of the first braking vector $V_{z,b1}$; $u_b$ is a battery voltage, and the battery voltage is equal to a rated voltage $u_N$ of the BLDCM; $u_{sc}$ is a supercapacitor voltage, $R_s$ and E are a phase resistance and a phase EMF of the BLDCM, respectively; I is a phase current amplitude of the BLDCM. Since the input line voltage of the motor is zero under the action of braking second vector $V_{z,c0}$, the duty cycle of $V_{z,c0}$ is not reflected in the formula, the same below.

The step 3) is specifically as follows:

3.1) Four kinds of vectors constructed:

when the bi-directional power switch in the HESU is turned on, the power MOSFET of the upper bridge arm on the positive conduction phase of the BLDCM and the power MOSFET of the lower bridge arm on the negative conduction phase of the BLDCM in the three-phase inverter are turned on, and the rest of the power devices are turned off, a voltage vector formed is called as a first electric vector $V_{m,b1}$;

when the second power MOSFET in the HESU is turned on, the power MOSFET of the upper bridge arm on the positive conduction phase of the BLDCM and the power MOSFET of the lower bridge arm on the negative conduction phase of the BLDCM in the three-phase inverter are turned on, and the rest of the power devices in the HESU and the three-phase inverter are turned off, a voltage vector formed is called as a second electric vector $V_{m,c1}$;

when the first power MOSFET in the HESU is turned on, the power MOSFET of the upper bridge arm on the positive conduction phase of the BLDCM and the power MOSFET of the lower bridge arm on the negative conduction phase of the BLDCM in the three-phase inverter are turned on, and the rest of the power devices in the HESU and the three-phase inverter are turned off, a voltage vector formed is a third electric vector $V_{m,s1}$;

when only the power MOSFET of the upper bridge arm on the positive conduction phase of the BLDCM or the power MOSFET of the lower bridge arm on the negative conduction phase of the BLDCM are turned on in the three-phase inverter, and the rest of the power devices in the three-phase inverter are turned off, a voltage vector formed is called as a fourth electric vector $V_{m,0}$ no matter what is the switching state of the power devices in the HESU.

3.2) When the motor operates in an acceleration mode, the combined action of different vectors satisfies the following relationship:

when a line voltage $u_{pn}$ between the positive conduction phase and the negative conduction phase of the BLDCM satisfies $u_{pn} \leq d_{max}u_b$, the first electric vector $V_{m,b1}$ and the fourth electric vector $V_{m,0}$ work together, which meets the following relationship $$u_{pn}=d_{m,b1}u_b=2E+2R_sI$$

where $d_{max}$ is a constrained duty cycle that limits an output current of the battery during the acceleration, and $d_{max}=I_{bat,max}/I$; $I_{bat,max}$ is a maximum output current of the battery, $u_b$ is the battery voltage, and the battery voltage is equal to the rated voltage of BLDCM $u_N$; $d_{m,b1}$ is a duty cycle of the first electric vector $V_{m,b1}$; $R_s$ and E are the phase resistance and the phase back EMF of the BLDCM, respectively, and I is the phase current amplitude of the BLDCM;

when $u_{pn}>d_{max}u_b$, the first electric vector $V_{m,b1}$, the third electric vector $V_{m,s1}$ and the fourth electric vector $V_{m,0}$ work together and meet the following relationship $$u_{pn}=d_{max}u_b\pm d_{m,s1}u_{sc}=2E+2R_sI$$

where $d_{m,s1}$ is a duty cycle of the third electric vector $V_{m,s1}$, $u_{sc}$ is a supercapacitor voltage;

when $u_{pn}>d_{max}(u_b+u_{sc})$, the third electric vector $V_{m,s1}$, the second electric vector $V_{m,c1}$ and the fourth electric vector $V_{m,0}$ work together and meet the following relationship $$u_{pn}=d_{max}u_b+(d_{max}+d_{m,c1})u_{sc}$$

where $d_{m,c1}$ is a duty cycle of the second electric vector $V_{m,c1}$.

3.3) When the motor operates in constant speed mode, the third electric vector $V_{m,s1}$ and the fourth electric vector $V_{m,0}$ work together during a commutation period and meet the following relationship $$2d_{m,s1}(u_b+u_{sc})=4E+3R_sI+u_b+u_{sc}.$$

The present invention designs a novel HESU through the above steps. When the motor operates in deceleration mode, the braking torque control is achieved and meanwhile the braking energy is fed back to the supercapacitor through the combined action of different vectors; when the motor operates in acceleration mode, the power sharing control between supercapacitor and battery is realized through the combined action of different vectors; when the motor operates in constant speed mode, the commutation torque ripple is suppressed by the combined action of different vectors.

Through the above steps, this method ensures that the BLDCM can obtain good control performance under the braking deceleration, acceleration and constant speed operation modes, and serve diverse needs in practical application. Moreover, the impact of frequent charging and discharging on the service life of battery can be well alleviated by using supercapacitor as energy buffer device.

The beneficial effects of the present invention are as follows:

(1) The proposed HESU is composed of battery, supercapacitor and power devices without additional inductors, which is conducive to reduce the volume of BLDCM drive system;

(2) In the process of braking deceleration operation, the motor converts the mechanical energy into electrical energy and the energy is stored into the supercapacitor, which improves the energy utilization rate and avoids the adverse effect of frequent charging on the battery;

(3) In the process of accelerating operation, the supercapacitor can assist the battery to supply power for the motor, which can effectively alleviate the problem of battery life shortening caused by excessive output power;

(4) In the process of constant speed operation, the high voltage output is realized by series connection of supercapacitor and battery at commutation time, thereby effectively suppressing commutation torque ripple of BLDCM and improving the stability of motor operation.

DETAILED DESCRIPTION OF THE PREFERRED EMBODIMENT

A control method of the BLDCM system based on the HESU in the present invention is described in detail in combination with the attached drawings and specific to embodiments.

Embodiment 1 of the Present Invention

The scheme of the embodiment 1 is introduced in combination with FIG. 2-FIG. 7 and the specific calculation formula. See the following description for details.

1. Topology of BLDCM System Powered by HESU

Figure 1:
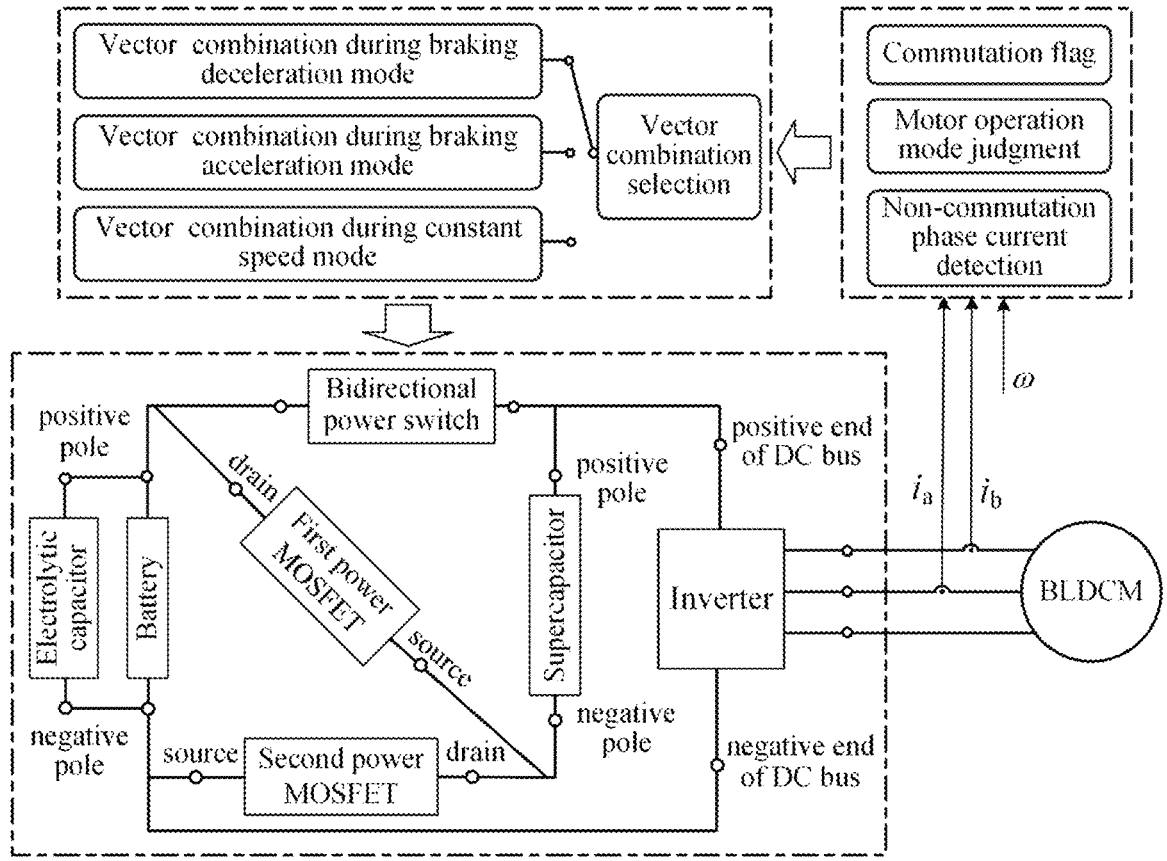
FIG. 1 shows a block diagram of a proposed control method of a BLDCM system based on HESU.
Figure 2:
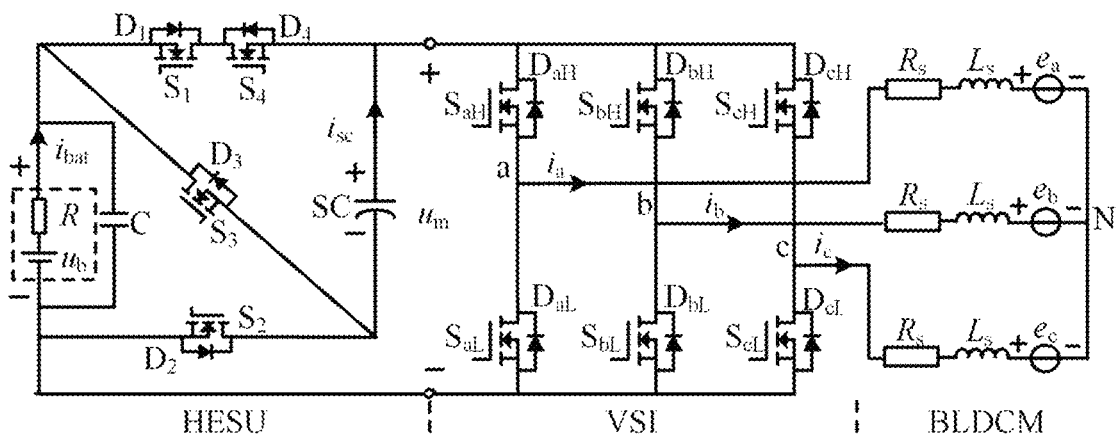
FIG. 2 shows the BLDCM system powered by an HESU.

FIG. 2 shows a BLDCM system powered by an HESU, including the HESU, an inverter and a BLDCM.

The designed HESU is mainly composed of a supercapacitor SC, a battery and power MOSFETs. A battery model is equivalent to a series structure of voltage source and resistance, as shown in the dotted frame. R and $u_b$ represent an internal resistance and a battery voltage, respectively. $S_1$ and $S_4$ are connected in reverse series to form a bidirectional power switch. $S_2$ represents a second power MOSFET, and $S_3$ represents a first power MOSFET; $D_1$ and $D_4$ are antiparallel diodes of $S_1$ and $S_4$, respectively; $D_2$ is an antiparallel diode of $S_z$, and $D_3$ is an antiparallel diode of $S_3$. $i_{bat}$ and $i_{sc}$ represent an output current of the battery and the supercapacitor, respectively. An electrolytic capacitor C is connected in parallel with the battery for assisting to provide energy required for a motor with a PWM modulation. A product of electrolytic capacitance and internal resistance R is much larger than a control cycle by selecting appropriate electrolytic capacitor, so that an output current of the battery $I_{bat}$ is approximately equal to its average $I_{BAT}$ in a control cycle.

$S_{aH}$, $S_{aL}$, $S_{bH}$, $S_{bL}$, $S_{cH}$ and $S_{cL}$ are six power MOSFETs of the inverter, $u_{in}$ represents the input voltage of the inverter. $R_s$ and $L_s$ are a phase resistance and a phase inductance, respectively. $e_k$ and $i_k$ (k=a, b, c) are a phase back electromotive force (EMF) and a phase current, respectively. N is a neutral point of the motor. $D_{aH}$, $D_{aL}$, $D_{bH}$, $D_{bL}$, $D_{cH}$ and $D_{cL}$ are antiparallel diodes of $S_{aH}$, $S_{aL}$, $S_{bH}$, $S_{bL}$, $S_{cH}$ and $S_{cL}$, respectively.

It is assumed that the battery voltage $u_b$ is equal to the rated voltage $u_N$ of BLDCM, and there are the following two situations according to the relationship between $u_b$ and the supercapacitor voltage $u_{sc}$.

When $u_{sc} \leq u_b$, there are three output modes of the HESU according to the different states of switches $S_1$-$S_4$.

Figure 3A:
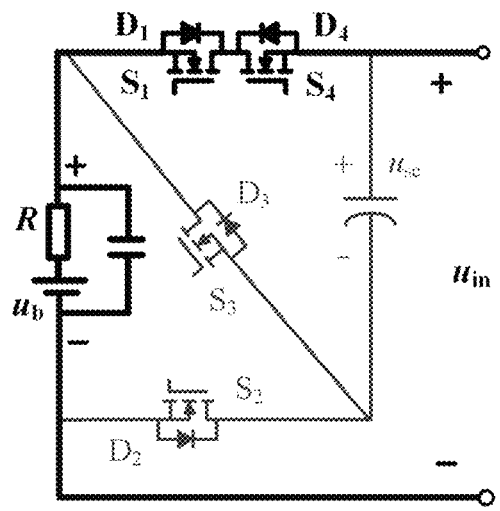
FIG. 3a shows a state diagram under an output mode 1 of the HESU.

FIG. 3a shows a state diagram under an output mode 1 of the HESU. When $S_1$ and $S_4$ are turned on and the rest switches are turned off in the HESU, since $u_b \geq u_{sc}$, the diodes $D_2$ and $D_3$ are cut off due to the reverse voltage $u_b-u_{sc}$ and $u_{sc}$, respectively. Ignoring the voltage drop of the internal resistance of the battery, there is $u_{in}=u_b$.

Figure 3B:
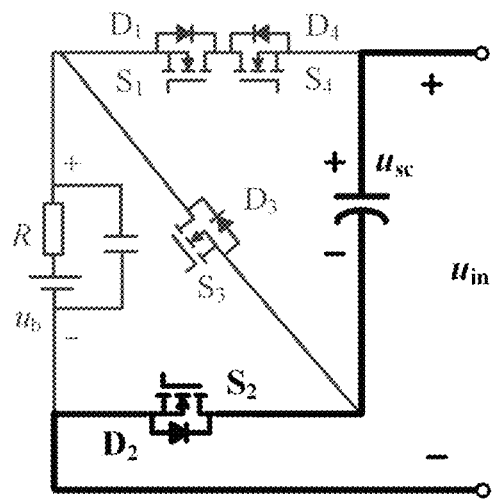
FIG. 3b shows a state diagram under an output mode 2 of the HESU.

FIG. 3b shows a state diagram under an output mode 2 of the HESU. When $S_2$ is turned on and the rest power devices are turned off in the HESU, the diode $D_3$ is cut off due to the reverse voltage $u_b$, there is $u_{in}=u_{sc}$.

Figure 3C:
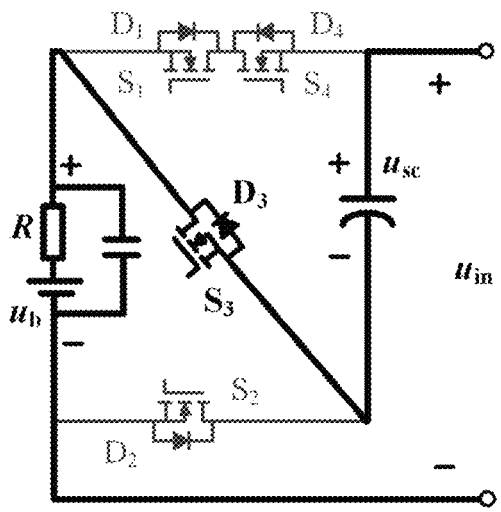
FIG. 3c shows a state diagram under an output mode 3 of the HESU.

FIG. 3c shows a state diagram under an output mode 3 of the HESU. When $S_3$ is turned on and the rest power devices are turned off in the HESU, the diode $D_2$ is cut off due to the reverse voltage $u_b$, there is $u_{in}=u_b+u_{sc}$.

Once the supercapacitor voltage $u_{sc}$ is detected to exceed the battery voltage, that is $u_{sc}>u_b$, $S_1$ and $S_4$ are turned on to make the supercapacitor charge the battery, until there is $u_{sc} u_b$.

2. Operation Principle of BLDCM

Figure 4:
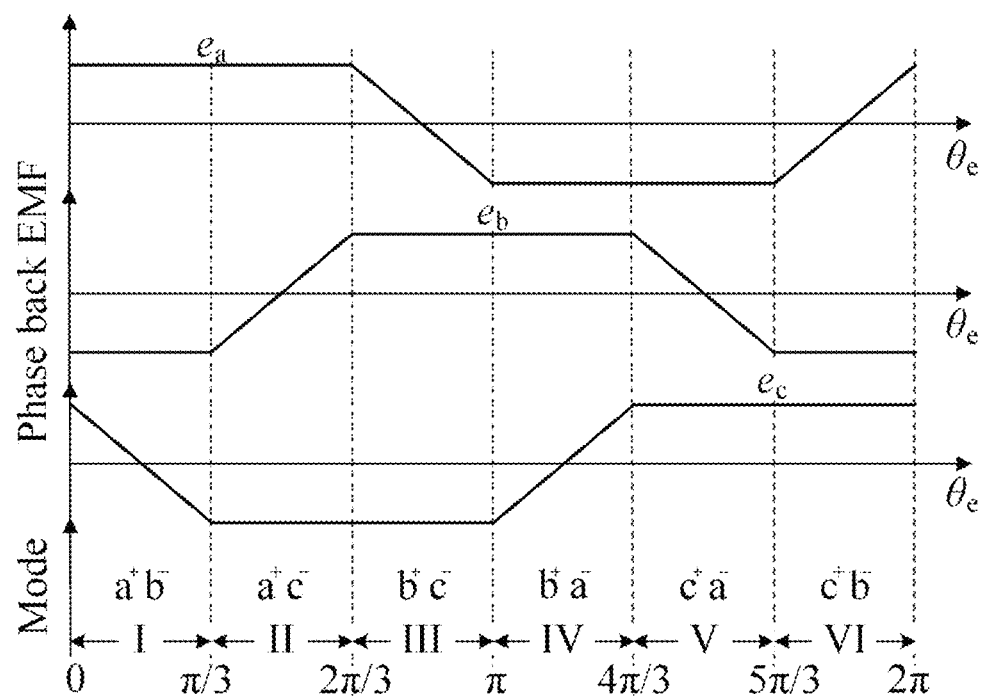
FIG. 4 shows an ideal back EMF waveform of the BLDCM.

FIG. 4 shows an ideal back EMF waveform of BLDCM. In this figure, $\theta_e$ represents the electrical angle, and the amplitude of the back EMF is $E=k_e\omega$ ($k_e$ represents the back EMF coefficient and $\omega$ represents the electrical angular speed). According to the rotor position, an electrical period can be divided into six sectors represented by I-VI.

BLDCM usually works in two-phase conduction mode, which means only two phases are energized and the other phase is inactive. According to the current direction, three phases can be defined as positive-conduction phase p, negative-conduction phase n and non-conduction phase o (p, n, o∈{a, b, c}). The working mode in each sector can be expressed as p+n−. The values of p and n in different sectors are shown in FIG. 4. For example, the phase a and phase b of the motor are conducted and p=a, n=b in sector I.

The terminal voltages of the two conduction phases can be expressed as:

$$\begin{cases} u_p = R_s i_p + L_s \dfrac{di_p}{dt} + e_p + u_N \\ u_n = R_s i_n + L_s \dfrac{di_n}{dt} + e_n + u_N \end{cases} \quad (1)$$

The phase current satisfies $i_p=i_n$ and the phase back EMF satisfies $e_p=e_n=E$. Substituting it into (1), the following equation is obtained $$u_{pn} = 2E + 2L_s \dfrac{di_p}{dt} + 2R_s i_p. \quad (2)$$

In (2), $u_{pn}=u_p-u_n$ and it represents the line voltage of the two conduction phases. When the positive-conduction phase current $i_p$ is maintained at the reference I*, with the voltage drop of the phase inductance ignoring, the line voltage that satisfying the normal operation of the motor is expressed as $$u_{pn}=2(E+R_s I^*). \quad (3)$$

3. Energy Recovery Control During Braking Deceleration Mode

When the BLDCM operates in the braking deceleration mode, in order to improve the energy utilization rate and avoid the adverse impact of frequent charging on the battery, the supercapacitor is used to recovery the energy in the braking process.

Since the controllability of the braking torque cannot be guaranteed when using unipolar modulation pattern, the bipolar modulation pattern H PWM-L PWM is adopted. Under this modulation pattern, the switch $S_{nH}$ of negative-conduction phase and the switch $S_{pL}$ of positive-conduction phase are chopped with the same duty ratio in each control cycle.

Figure 5A:
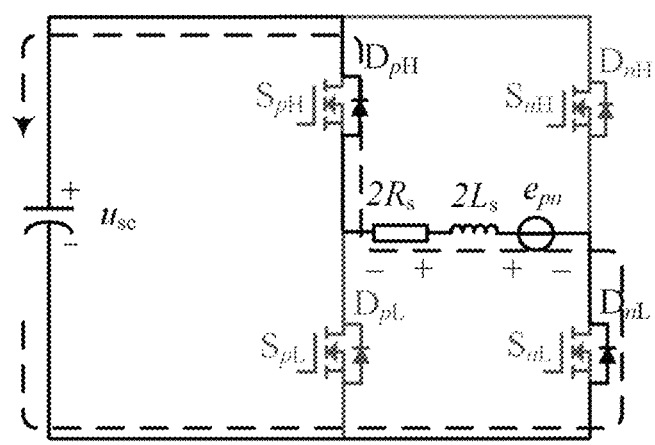
FIG. 5a shows an equivalent circuit under an action of vector $V_{z,c0}$.
Figure 5B:
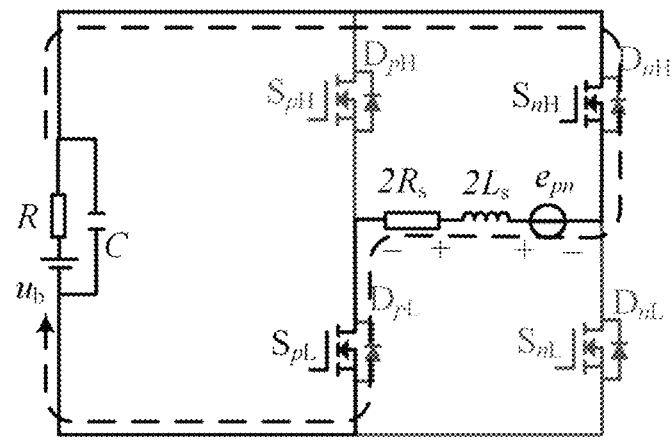
FIG. 5b shows an equivalent circuit under an action of vector $V_{z,b1}$.

When $S_{nH}$ and $S_{pL}$ are turned off, the energy regenerated by motor will be fed back to the supercapacitor through the output mode 2 of HESU. In this situation, the voltage vector corresponding to the switching state of power devices is defined as vector $V_{z,c0}$, and FIG. 5a shows an equivalent circuit under an action of vector $V_{z,c0}$. When $S_{nH}$ and $S_{pL}$ are turned on, the motor absorbs energy. Since the supercapacitor is not expected to output energy in the braking process, the battery is used to supply power for the motor through the output mode 1 of HESU. In this situation, the voltage vector corresponding to the switching state of power devices is defined as vector $V_{z,b1}$, and FIG. 5b shows an equivalent circuit under an action of vector $V_{z,b1}$.

Under different vectors, the line voltage of the two conduction phases is $$u_{pn} = \begin{cases} u_{sc} & V_{z,c0} \\ -u_b & V_{z,b1} \end{cases}. \quad (4)$$

In the braking process, the duty ratios of $V_{z,b1}$ and $V_{z,c0}$ are set to $d_{z,b1}$ and $1-d_{z,b1}$, respectively. Considering that the BLDCM decelerates with constant braking torque, there is $I^*=-I<0$. According to (3) and (4), in order to realize the braking torque control, the following condition should be satisfied under the combined action of different vectors $$d_{z,b1}u_b+(d_{z,b1}-1)u_{sc}=2R_s I-2E. \quad (5)$$

The average output current of supercapacitor in each control cycle is $I_{sc}=(d_{z,b1}-1)I<0$. Therefore, using the above control method, the supercapacitor in the designed HESU can store energy in the braking deceleration mode.

4. Power Sharing Control During Acceleration Mode

In order to achieve fast starting, the motor usually needs to output large torque during the acceleration mode. The maximum output current of battery is set to $I_{bat,max}$. If the reference of phase current $I^*=I>I_{bat,max}$, then the supercapacitor can be used to assist battery to supply power for the motor, so as to limit the output current of battery to $I_{bat,max}$.

During the acceleration mode, ON PWM modulation pattern is used for inverter. When the rotor is located in sectors I, III, V, the switch $S_p H$ of positive-conduction phase is always turned on and the switch $S_{nL}$ of negative-conduction phase is chopped. When the rotor is located in sectors II, IV, VI, $S_p H$ is chopped and $S_{nL}$ is always turned on. The following takes sectors I, III, V as an example to analyze.

Figure 6A:
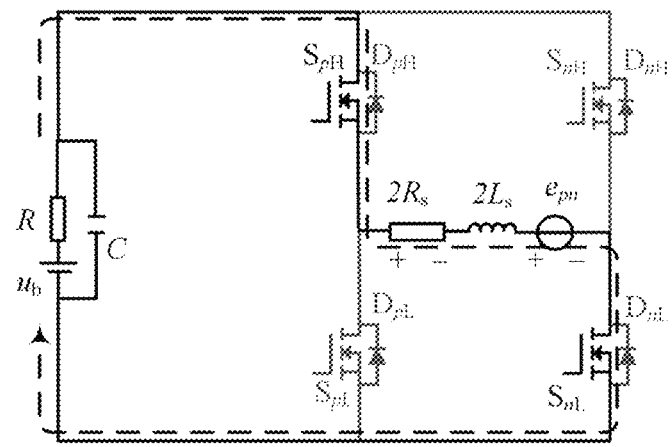
FIG. 6a shows an equivalent circuit under an action of vector $V_{m,b1}$.
Figure 6B:
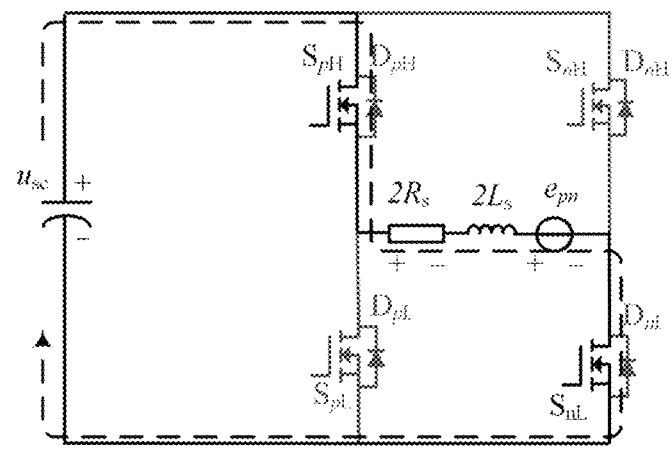
FIG. 6b shows an equivalent circuit under an action of vector $V_{m,c1}$.
Figure 6C:
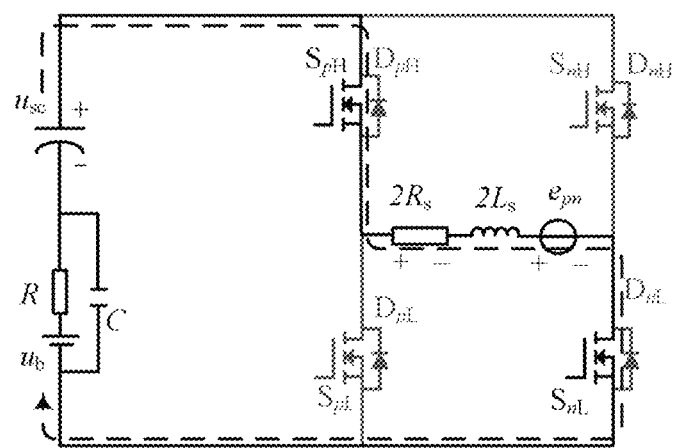
FIG. 6c shows an equivalent circuit under an action of vector $V_{m,s1}$.

When $S_p H$ and $S_{nL}$ are turned on, the motor absorbs energy. Combining with the three output modes of HESU, we can obtain the vector $V_{m,b1}$ when the battery supply power alone, the vector $V_{m,c1}$ when the supercapacitor supply power alone, and the vector $V_{m,s1}$ when the battery and supercapacitor supply power in series. FIG. 6a, FIG. 6b and FIG. 6c shows equivalent circuits under an action of vector $V_{m,b1}$, vector $V_{m,c1}$ and vector $V_{m,s1}$, respectively.

Figure 6D:
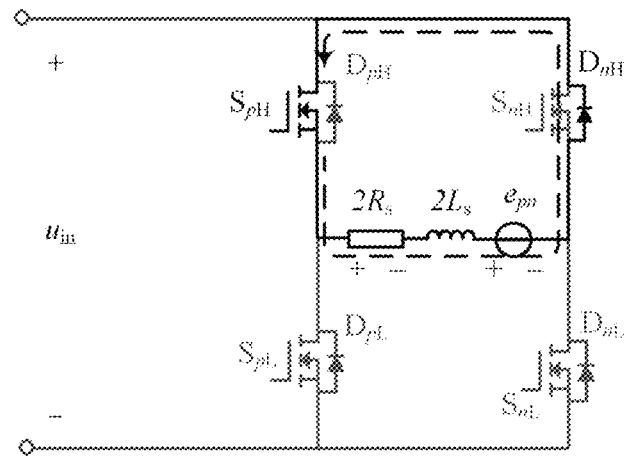
FIG. 6d shows an equivalent circuit under an action of vector $V_{m,0}$.

When $S_{pH}$ is turned on and $S_{nL}$ is turned off, the motor will not absorb energy, and the phase current freewheels through $D_{nH}$ and $S_{pH}$. Since the freewheeling path is independent of the output mode of the HESU, the corresponding voltage vector is defined as vector $V_{m,0}$ no matter what is the switching state of the power devices in the HESU. FIG. 6d shows the equivalent circuit under the action of vector $V_{m,0}$;

Under different vectors, the line voltage of the two conduction phases is $$u_{pn} = \begin{cases} u_b & V_{m,b1} \\ u_{sc} & V_{m,c1} \\ u_{sc} + u_b & V_{m,s1} \\ 0 & V_{m,0} \end{cases} \quad (6)$$

The duty ratios of the effective vectors $V_{m,b1}$, $V_{m,c1}$ and $V_{m,s1}$ are set to $d_{m,b1}$, $d_{m,c1}$ and $d_{m,s1}$, respectively. Since the battery outputs current under $V_{m,b1}$ or $V_{m,s1}$ and the supercapacitor outputs current under $V_{m,s1}$ or $V_{m,s1}$, the average output current of battery in each control cycle is $I_{bat}=(d_{m,b1}+d_{m,s1})I$, and the average output current of supercapacitor is $I_{sc}=(d_{m,s1}+d_{m,c1})I$. Then, according to the operating condition of the motor, the combination of different vectors is designed to realize the supercapacitor assist the battery to supply power for the motor, so as to limit the output current of battery in the acceleration process.

Combining (3) and (6), the duty ratio of each effective vector should satisfy the following condition to obtain the line voltage required for normal operation $$u_{pn}=(d_{m,b1}+d_{m,s1})u_b+(d_{m,s1}+d_{m,c1})u_{sc}=2E+2R_sI. \quad (7)$$

In order to limit $I_{bat}$ to the maximum output current $I_{bat,max}$, the duty ratios of vectors in (7) should satisfy the following constraint $$(d_{m,b1}+d_{m,s1}) \le d_{max} = \frac{I_{bat,max}}{I}. \quad (8)$$

From (7), the required voltage $u_{pn}$ is related to the motor speed and phase current. According to the value range of $u_{pn}$, the zero vector $V_{m,0}$ always exists, while the duty ratios of the effective vectors $V_{m,b1}$, $V_{m,c1}$ and $V_{m,s1}$ are calculated in accordance with the following three conditions:

1) When $u_{pn}$ is small, only the effective vector $V_{m,b1}$ is used, that is $d_{m,s1}=d_{m,c1}=0$. Substituting it into (7), the following equation is obtained $$u_{pn}=d_{m,b1}u_b=2E+2R_sI. \quad (9)$$

From (9), the duty ratio $d_{m,b1}$ of $V_{m,b1}$ can be obtained. Moreover, further consideration is given to the constraint as shown in (8), where $d_{m,b1} \le d_{max}$ should be guaranteed. Therefore, when $u_{pn} \le d_{max}u_b$ is satisfied, $I_{bat} \le I_{bat,max}$ can be ensured by only using the effective vector $V_{m,b1}$.

2) When $u_{pn} > d_{max}u_b$, the effective vectors $V_{m,b1}$, $V_{m,s1}$ are used, that is $d_{mci}=0$. In order to make the best use of the output current of battery, the boundary value $(d_{m,b1}+d_{m,s1})=d_{max}$ is taken according to the constraint as shown in (8). Substituting it into (7), the following equation is gotten $$u_{pn}=d_{max}u_b+d_{m,s1}u_{sc}+=2E+2R_sI. \quad (10)$$

From (10), the duty ratio $d_{m,s1}$ of $V_{m,s1}$ can be obtained. Moreover, further consideration is given to the constraint shown in (8), where $d_{m,s1} \le d_{max}$ should be guaranteed. Therefore, when $u_{pn} \le d_{max}(u_b+u_{sc})$ is satisfied, $I_{bat} \le I_{bat,max}$ can be guaranteed by using effective vectors $V_{m,b1}$ and $V_{m,s1}$.

3) When $u_{pn} > d_{max}(u_b+u_{sc})$, the effective vectors $V_{m,s1}$, $V_{m,c1}$ are used, namely $d_{m,b1}=0$. In order to make the best use of the output current of battery, the boundary value $(d_{m,b1}+d_{m,s1})=d_{max}$ is taken according to the constraint shown in (8) to ensure $I_{bat} \le I_{bat,max}$. Since $d_{m,b1}=0$, there is $d_{m,s1}=d_{max}$. Substituting it into (7), the following equation is gotten $$u_{pn}=d_{max}u_b+(d_{max}+d_{m,c1})u_{sc}. \quad (11)$$

From (11), the duty ratio $d_{m,c1}$ of $V_{m,c1}$ can be obtained.

In summary, when the phase current I exceeds $I_{bat,max}$ in the accelerated process, the output current of battery can be limited to $I_{bat,max}$ by designing different vector combinations. The duty ratio of each vector needs to be calculated according to the different value range of $u_{pn}$.

5. Commutation Torque Ripple Suppression During Constant Speed Operation Mode

When the BLDCM operates in constant speed mode, the reference of phase current satisfies $0 \le I \le I_{bat,max}$, the battery can supply power for the motor alone through the output mode 1 of HESU shown in FIG. 3a. In addition, in the commutation process of BLDCM, the high output voltage can be obtained by connecting the supercapacitor and battery in series, so as to satisfy the voltage required for commutation torque ripple suppression and further expand the function of the HESU.

In the process of current commutation for BLDCM, the commutated current cannot be changed abruptly due to the existence of winding inductance, in which case there is current in all three-phase windings and this region is generally called as commutation period. The three phases of the motor during the commutation period can be defined as incoming phase x, non-commutation phase y and outgoing phase z (x, y, z∈{a, b, c}).

The three-phases terminal voltages of the motor can be expressed as follows $$\begin{cases} u_x = R_s i_x + L_s \dfrac{di_x}{dt} + e_x + u_N \\ u_y = R_s i_y + L_s \dfrac{di_y}{dt} + e_y + u_N \\ u_z = R_s i_z + L_s \dfrac{di_z}{dt} + e_z + u_N \end{cases} \quad (12)$$

The electromagnetic torque $T_e$ during the commutation period can be expressed as $$T_e = \frac{e_x i_x + e_y i_y + e_z i_z}{\omega}. \quad (13)$$

Taking the positive current commutation in sectors I, III, V as an example. The incoming phase x corresponds to the positive-conduction phase p; the non-commutation phase y corresponds to the negative-conduction phase n; the outgoing phase z corresponds to the non-conduction phase o. That is, x=p, y=n, z=o. Since the commutation period is short, the phase back EMF is assumed to be unchanged, i.e. $e_x=e_y=e_z=E$. As the stator windings are connected in star, phase current meets $i_x+i_y+i_z=0$. Substituting them into (13) to obtain $$T_e = -\frac{2Ei_y}{\omega}. \quad (14)$$

It can be seen from (14) that the commutation torque ripple can be suppressed by keeping the non-commutation phase current steady. According to (12), the average change rate of $i_y$ in a control cycle can be deduced as $$\left.\frac{di_y}{dt}\right|_{avg} = \frac{2u_y - u_x - u_z + 4E - 3R_s i_y}{3L_s}. \quad (15)$$

When the positive current commutates, the non-commutation phase y corresponds to the negative-conduction phase n, so there is $i_y = i_n = -i_p = -I$. The non-commutation phase current can be kept steady by setting (15) to zero, and then the terminal voltages of three phases should satisfy $$u_x + u_z - 2u_y = 4E + 3R_s I.$$

Figure 7A:
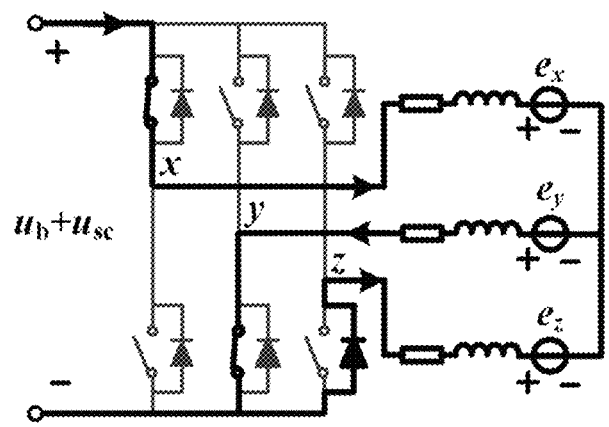
FIG. 7a shows an equivalent circuit under an action of vector $V_{m,s1}$ during positive current commutation.
Figure 7B:
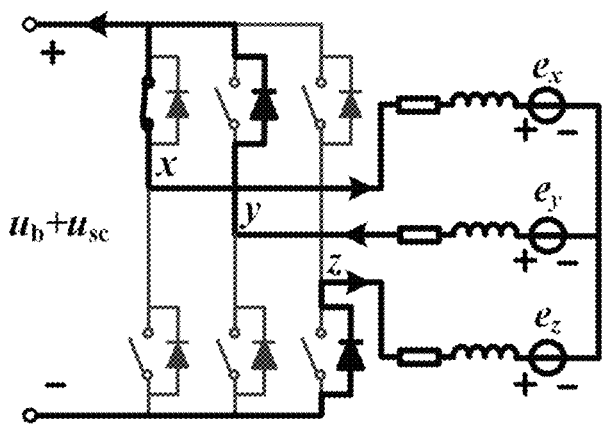
FIG. 7b shows an equivalent circuit under an action of vector $V_{m,0}$ during positive current commutation.

During the commutation period, the ON PWM modulation pattern is still adopted, in which the power MOSFET of upper bridge arm of incoming phase $S_{xH}$ is always on, and the power MOSFET of lower bridge arm of non-commutation phase $S_{yL}$ is chopped with duty ratio d. In order to provide high voltage required for suppressing commutation torque ripple, the output mode 3 of HESU is adopted during this commutation period, in which the motor is supplied by supercapacitor and battery in series. Then, the vector $V_{m,s1}$ and vector $V_{m,0}$ are used to suppress the commutation torque ripple. FIG. 7a shows an equivalent circuit under an action of vector $V_{m,s1}$, where $u_x = u_b + u_{sc}$, $u_y = 0$; FIG. 7b shows the equivalent circuit under the action of vector $V_{m,0}$, where $u_x = u_b + u_{sc}$, $u_y = u_b + u_{sc}$. Because the current cannot change suddenly in the process of commutation, the outgoing phase current $i_z$ freewheels through the diode $D_{zL}$, and $u_z = 0$.

In the commutation period, the duty cycle of $V_{m,s1}$ is set to d, then the average voltage of three-phase windings is as follows $$\begin{cases} u_x = u_b + u_{sc} \\ u_y = (1-d)(u_b + u_{sc}) \\ u_z = 0 \end{cases} \quad (17)$$

Substituting (17) into (16), the duty cycle d which can maintain the non-commutation phase current steady can be obtained as $$d = \frac{4E + 3R_s I + u_b + u_{sc}}{2(u_b + u_{sc})}. \quad (18)$$

Embodiment 2 of the Present Invention

Figure 8:
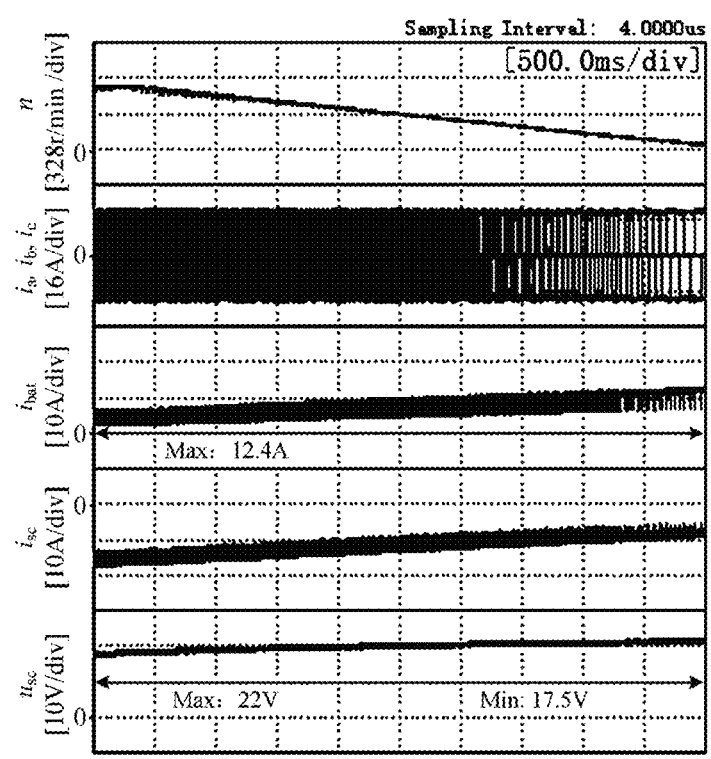
FIG. 8 shows experimental results of an embodiment of the present invention in a braking deceleration mode.

Based on the specific experimental data, the feasibility of the scheme in embodiment 1 is verified in FIG. 8-FIG. 10. See the following description for details.

The embodiment 1 of the present invention is verified in a 200 W BLDCM system. The motor parameters are shown in Table I. In the experimental test platform, the control unit is composed of digital signal processor (DSP) and field programmable gate array (FPGA). The DSP is mainly responsible for the calculation of control algorithm, and the FPGA is mainly responsible for generating the required switch signal. The load is provided by a servo motor working in speed mode and controlled by Siemens inverter S120.

TABLE I

| Parameter | Symbol | Valve | Unit |
| --- | --- | --- | --- |
| Capacitance of supercapacitor | SC | 10 | F |
| Capacitance of electrolytic capacitor | C | 3300 | μF |
| Battery voltage | $u_b$ | 24 | V |
| Battery maximum output current | $I_{bat,max}$ | 14 | A |
| Motor rated voltage | $u_N$ | 24 | V |
| Motor rated current | $I_N$ | 14 | A |
| Motor rated load | $T_N$ | 3.2 | N · m |
| Motor rated speed | $n_N$ | 600 | r/min |
| phase resistance | $R_s$ | 0.2415 | Ω |
| pole pairs | p | 4 | |
| switching frequency | f | 20 | kHz |

1. Experimental Verification During Braking Deceleration Mode

FIG. 8 shows experimental results of using supercapacitor to recovery energy under the braking deceleration mode. The reference of phase current is set as I*=−20 A, the motor speed decreases from 600 r/min to 40 r/min. As shown in FIG. 8, the waveforms from top to bottom are motor speed n, three phase currents $i_a$, $i_b$ and $i_c$, output current of battery $I_{bat}$, output current of supercapacitor $i_{sc}$, and supercapacitor voltage $u_{sc}$. FIG. 8 shows that the output current of supercapacitor is always negative, so the supercapacitor recoveries energy continuously in the braking process, and the supercapacitor voltage rises gradually from 17.5V to 22V.

2. Experimental Verification During Acceleration Operation Mode

Figure 9A:
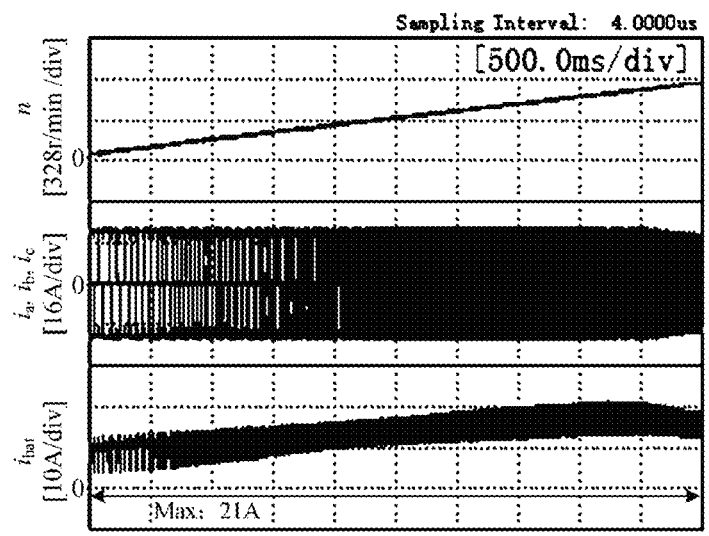
FIG. 9a shows experimental results of a traditional method with battery power supply alone during an acceleration operation mode.

In order to verify that the scheme in the embodiment 1 of the present invention can utilize the supercapacitor to assist the battery to supply power for the motor during the acceleration mode, so as to limit the maximum output current of the battery, FIG. 9a shows experiment results of the traditional ON PWM modulation pattern with the battery powered alone. The reference of phase current is set as I*=1.5$I_{bat,max}$=21 A, and the motor accelerates from 40 r/min to 600 r/min. As shown in FIG. 9a, the waveforms from the top to bottom are motor speed n, three phase current $i_a$, $i_b$ and $i_c$, output current of battery $I_{bat}$.

Figure 9B:
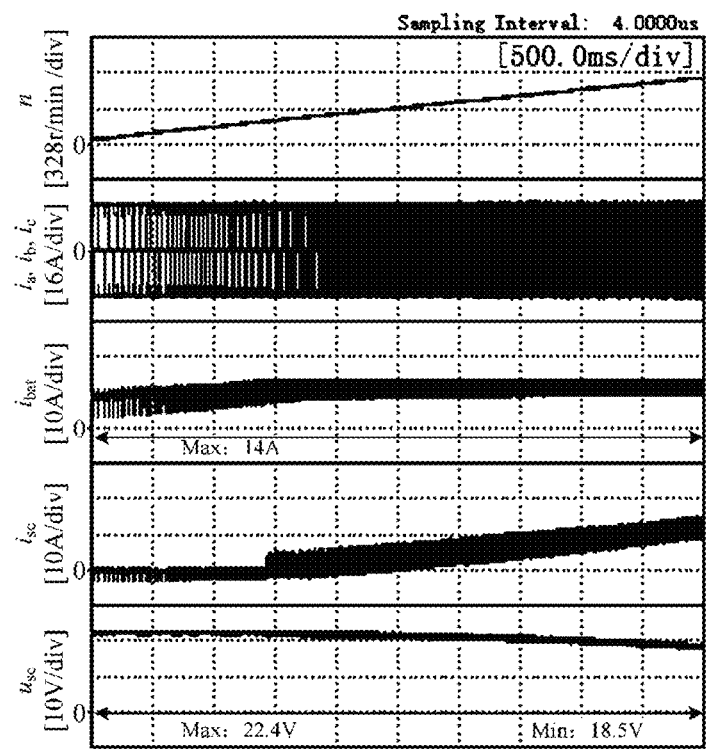
FIG. 9b shows experimental results of the embodiment of the present invention during the acceleration operation mode.

It can be seen from FIG. 9a that with the motor speed increasing, the output current of battery increases continuously and exceeds the maximum output current 14 A, and its peak value reaches 21 A. In comparison, FIG. 9b shows experimental result of the scheme in the embodiment 1 of the present invention under the same condition. The waveforms from top to bottom are motor speed n, three phase currents $i_a$, $i_b$ and $i_c$, output current of battery $I_{bat}$, output current of supercapacitor $i_{sc}$, and supercapacitor voltage $u_{sc}$, respectively. It can be seen from FIG. 9b that the scheme in the embodiment 1 of the present invention can utilize supercapacitor to assist the battery to supply power for the motor in the acceleration process, thus limiting the output current of battery to 14 A. Meanwhile, with the supercapacitor discharging, its voltage drops from 22.4V to 18.5V.

3. Experimental Verification During Constant Speed Mode

Figure 10A:
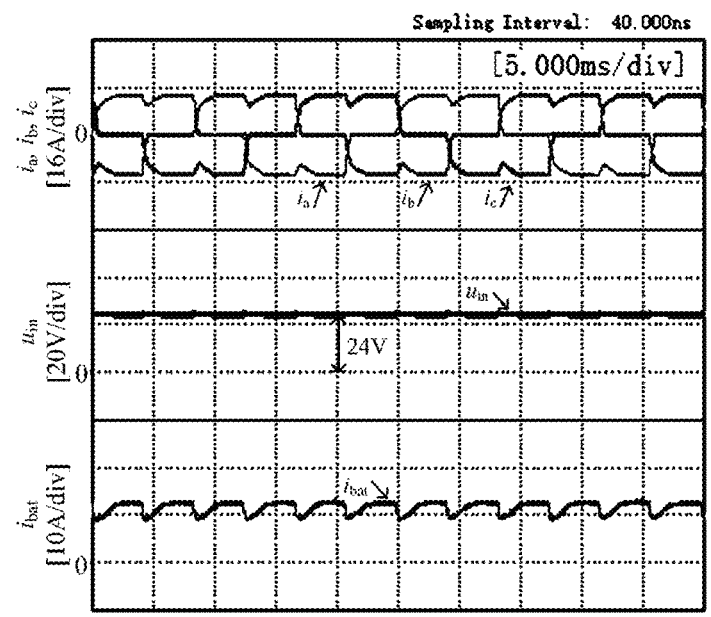
FIG. 10a shows experimental results of the traditional method with battery power supply alone during a constant speed mode.
Figure 10B:
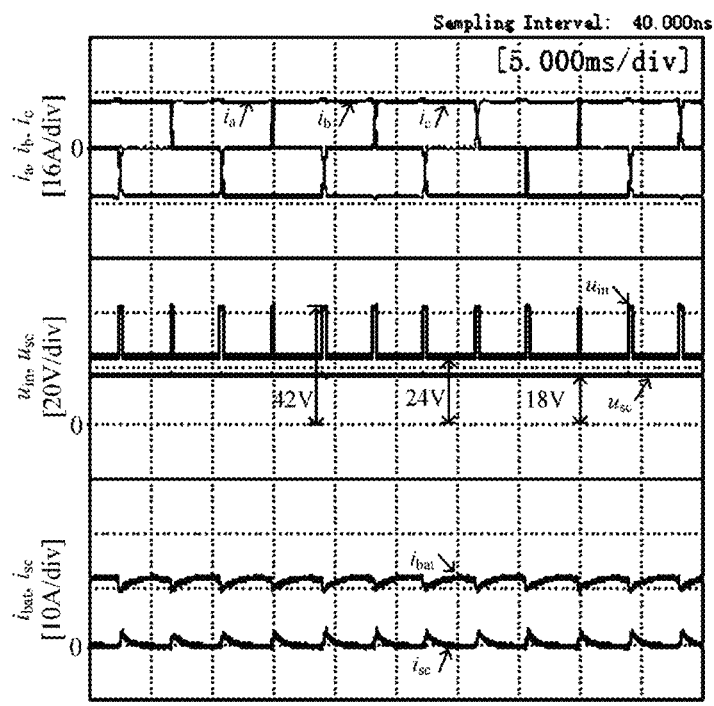
FIG. 10b shows experimental results of the embodiment of the present invention during the constant speed mode.

In order to verify that the scheme in the embodiment 1 of the present invention can effectively suppress the commutation torque ripple during the constant speed mode of the motor, FIG. 10a shows experiment results of the traditional ON PWM modulation pattern with the battery powered alone. The reference of phase current is set to I*=14 A and the motor speed is set to 600 r/min. As shown in FIG. 10a, the waveforms from the top to bottom are three phases current $i_a$, $i_b$ and $i_c$, input voltage of the inverter $u_{in}$ and output current of battery $i_{bat}$. It can be seen from FIG. 10a that when using the traditional method, the phase current of the motor during the commutation period will drop significantly, which will lead to large commutation torque ripple. With the same working condition, FIG. 10b shows experimental result of the proposed scheme in the embodiment 1 of the present invention based on the designed HESU, and the waveforms from top to bottom are three phase currents $i_a$, $i_b$ and $i_c$, input voltage of the inverter $u_{in}$, supercapacitor voltage $u_{sc}$, output current of battery $i_{bat}$ and output current of supercapacitor $i_{sc}$. As shown in FIG. 10b, input voltage of the inverter $u_{in}$=24V during the the non-commutation period, whereas the input voltage $u_{in}$=$u_b$+$u_{sc}$=42V during the commutation period and $u_{sc}$=18V. It indicates that the designed HESU can achieve high voltage output by connecting the battery and supercapacitor in series. Thus, the stable control of non-commutation current is realized and the commutation torque ripple is effectively suppressed.

In summary, through the above steps, the embodiments of the present invention can realize the energy recovery control during the braking deceleration mode, the power sharing control during the acceleration mode and the commutation torque ripple suppression during the constant speed mode, which can meet various needs in practical application.

The embodiments of the present invention have no limitation on the model of other devices except for special description, so long as the device can complete the above functions.

The technicians of this field can understand that the attached drawing is only schematic diagram of a preferred embodiment. The serial number of the embodiment of the present invention is only for description and does not represent the advantages and disadvantages of the embodiment.

The above is only a better embodiment of the present invention and does not limit the present invention. Any modification, equivalent replacement, improvement, etc. made within the spirit and principle of the present invention shall be included in the protection scope of the present invention.

What is claimed is:

1. A control method of brushless DC motor (BLDCM) system based on a hybrid energy storage unit (HESU), comprising steps of:
   1) designing the HESU with a battery, an electrolytic capacitor C, a bidirectional power switch, a first power MOSFET, a second power MOSFET and a supercapacitor SC; wherein after the first power MOSFET and the second power MOSFET are connected in series, they are connected in parallel with the electrolytic capacitor C to both terminals of the battery; a drain of the first power MOSFET is connected to a positive pole of the battery, and after the bidirectional power switch and supercapacitor SC are connected in series, they are connected in parallel to both terminals of the first power MOSFET; a lead between a source of the second power MOSFET and a negative pole of the battery is taken as a negative terminal of the HESU, and a lead between the bidirectional power switch and a positive pole of the supercapacitor SC is taken as a positive terminal of the HESU; output terminals of the HESU are connected to input terminals of a three-phase inverter, and output terminals of the three-phase inverter are connected with a three-phase winding of the BLDCM;
   2) controlling the motor is in braking operation, wherein according to an effect of a switching state of the power MOSFETs in the HESU and the three-phase inverter on an input line voltage of the BLDCM, two kinds of braking vectors are constructed; through a combined action of the two braking vectors, braking torque control is realized and braking energy is fed back to the supercapacitor SC at the same time; and
   3) controlling the motor is in electric operation, wherein according to the effect of the switching state of the power MOSFETs in the HESU and the three-phase inverter on the input line voltage of the BLDCM, four kinds of electric vectors are constructed;
   when the motor is in electric acceleration operation, power sharing control between the battery and the supercapacitor is realized through a combined action of different electric vectors;
   when the motor is in electric constant speed operation, a torque ripple in commutation period is suppressed by the combined action of different electric vectors.

2. The control method, as recited in claim 1, wherein the step 2) comprises specific steps of:
   2.1) constructing two kinds of vectors, wherein: when the bi-directional power switch in the HESU is turned on, the power MOSFET of a lower bridge arm on a positive conduction phase of the BLDCM and the power MOSFET of an upper bridge arm on a negative conduction phase of the BLDCM in the three-phase inverter are turned on, and the rest of the power devices in the HESU and the three-phase inverter are turned off, a voltage vector formed is called as a first braking vector $V_{z,b1}$; when the second power MOSFET in the HESU is turned on, and the other power devices in the HESU and the three-phase inverter are turned off, a voltage vector formed is called as a second braking vector $V_{z,c0}$;
   2.2) performing the combined action of the two vectors, which satisfies the following relationship:

$$d_{z,b1}u_b+(d_{z,b1}-1)u_{sc}=2R_sI-2E$$

where $d_{z,b1}$ is a duty cycle of the first braking vector $V_{z,b1}$; $u_b$ is a battery voltage, and the battery voltage is equal to a rated voltage $u_N$ of the BLDCM; $u_{sc}$ is a supercapacitor voltage; $R_s$ and $E$ are a phase resistance and a phase back electromotive force (EMF) of the BLDCM, respectively; I is a phase current amplitude of the BLDCM.

3. The control method, as recited in claim 1, wherein the step 3) comprises specific steps of:
   3.1) constructing four types of vectors, wherein:
   when the bi-directional power switch in the HESU is turned on, the power MOSFET of an upper bridge arm on a positive conduction phase of the BLDCM and the power MOSFET of a lower bridge arm on a negative conduction phase of the BLDCM in the three-phase inverter are turned on, and the rest of the power devices are turned off, a voltage vector formed is called as a first electric vector $V_{m,b1}$;
   when the second power MOSFET in the HESU is turned on, the power MOSFET of the upper bridge arm on the positive conduction phase of the BLDCM and the power MOSFET of the lower bridge arm on the negative conduction phase of the BLDCM in the three-phase inverter are turned on, and the rest of the power devices in the HESU and the three-phase inverter are turned off, a voltage vector formed is called as a second electric vector $V_{m,c1}$;
   when the first power MOSFET in the HESU is turned on, the power MOSFET of the upper bridge arm on the positive conduction phase of the BLDCM and the power MOSFET of the lower bridge arm on the negative conduction phase of the BLDCM in the three-phase inverter are turned on, and the rest of the power devices in the HESU and the three-phase inverter are turned off, a voltage vector formed is a third electric vector $V_{m,s1}$;

when only the power MOSFET of the upper bridge arm on the positive conduction phase of the BLDCM or the power MOSFET of the lower bridge arm on the negative conduction phase of the BLDCM are turned on in the three-phase inverter, and the rest of the power devices in the three-phase inverter are turned off, a voltage vector formed is called as the fourth electric vector $V_{m,0}$ no matter what is a switching state of the power devices in the HESU;

3.2) operating the motor in an acceleration mode, wherein a combined action of different vectors satisfies the following relationship:

when a line voltage $u_{pn}$ between the positive conduction phase and the negative conduction phase of the BLDCM satisfies $u_{pn} \leq d_{max}u_b$, the first electric vector $V_{m,b1}$ and the fourth electric vector $V_{m,0}$ work together, which meets the following relationship $$u_{pn}=d_{m,b1}u_b=2E+2R_sI$$

where $d_{max}$ is a constrained duty cycle that limits an output current of the battery during the acceleration mode, and $d_{max}=I_{bat,max}/I$; $I_{bat,max}$ is a maximum output current of the battery; $u_b$ is a battery voltage, and the battery voltage is equal to a rated voltage $u_N$ of BLDCM; $d_{m,b1}$ is a duty cycle of the first electric vector $V_{m,b1}$; $R_s$ and $E$ are a phase resistance and a phase back EMF of the BLDCM, respectively, and $I$ is a phase current amplitude of the BLDCM;

when $u_{pn}>d_{max}u_b$, the first electric vector $V_{m,b1}$, the third electric vector $V_{m,s1}$ and the fourth electric vector $V_{m,0}$ work together and meet the following relationship $$u_{pn}=d_{max}u_b \pm d_{m,s1}u_{sc}=2E+2R_sI$$

where $d_{m,s1}$ is a duty cycle of the third electric vector $V_{m,s1}$, $u_{sc}$ is a supercapacitor voltage;

when $u_{pn}>d_{max}(u_b+u_{sc})$, the third electric vector $V_{m,s1}$, the second electric vector $V_{m,s1}$ and the fourth electric vector $V_{m,0}$ work together and meet the following relationship $$u_{pn}=d_{max}u_b+(d_{max}+d_{m,c1})u_{sc}$$

where $d_{m,c1}$ is a duty cycle of the second electric vector $V_{m,c1}$; and 3.3) operating the motor in a constant speed mode, wherein the third electric vector $V_{m,s1}$ and the fourth electric vector $V_{m,0}$ work together in a commutation period and meet the following relationship $$2d_{m,s1}(u_b+u_{sc})=4E+3R_sI+u_b+u_{sc}.$$

4. The control method, as recited in claim 1, wherein the positive terminal of the output of the HESU is connected to the positive terminal of a DC bus of the three-phase inverter, and the negative terminal of the output of the HESU is connected to the negative terminal of the DC bus of the three-phase inverter.

5. The control method, as recited in claim 1, wherein the bidirectional power switch is composed of two MOSFETs in reverse series connection.

6. The control method, as recited in claim 1, wherein the three-phase inverter comprises three parallel MOSFET groups, each MOSFET group is composed of two series-connection MOSFETs in the same direction, and a lead between the two MOSFETs of each group is connected to a phase winding of the BLDCM.

\* \* \* \* \*